United States Patent [19]

Ikeda et al.

[11] 4,144,221
[45] Mar. 13, 1979

[54] CURABLE ORGANOPOLYSILOXANE COATING COMPOSITION CONTAINING BICYCLIC AMIDINE CURING CATALYST

[75] Inventors: Tadayoshi Ikeda, Amagasaki; Saizo Ikeda, Sakai; Kaname Hashimoto, Himeji; Masaru Higuchi, Saitama, all of Japan

[73] Assignee: Daicel Ltd., Sakai, Japan

[21] Appl. No.: 873,230

[22] Filed: Jan. 30, 1978

[30] Foreign Application Priority Data

Feb. 21, 1977 [JP] Japan ................................. 52-17970

[51] Int. Cl.$^2$ ............................................. C08G 77/26
[52] U.S. Cl. ..................... 260/33.4 SB; 260/32.8 SB; 528/10; 528/21; 528/28; 528/32; 528/33; 528/43
[58] Field of Search ..................... 260/31.8 S, 32.8 S, 260/33.2 SB, 33.4 SB, 33.6 SB, 46.5 R; 528/21, 28

[56] References Cited

PUBLICATIONS

Chemical Abstracts, vol. 72, No. 31790y, Walter, 1972.
Chemical Abstracts, vol. 69, No. 67412d, 1968.

Primary Examiner—Paul R. Michl
Attorney, Agent, or Firm—Blanchard, Flynn, Thiel, Boutell & Tanis

[57] ABSTRACT

A composition comprising:
(a) a curable organosilicic compound containing hydroxyl group or alkoxy group bonded to silicon,
(b) cyclic amidines or weak acid salts of said cyclic amidines and
(c) a solvent for them.

11 Claims, 1 Drawing Figure

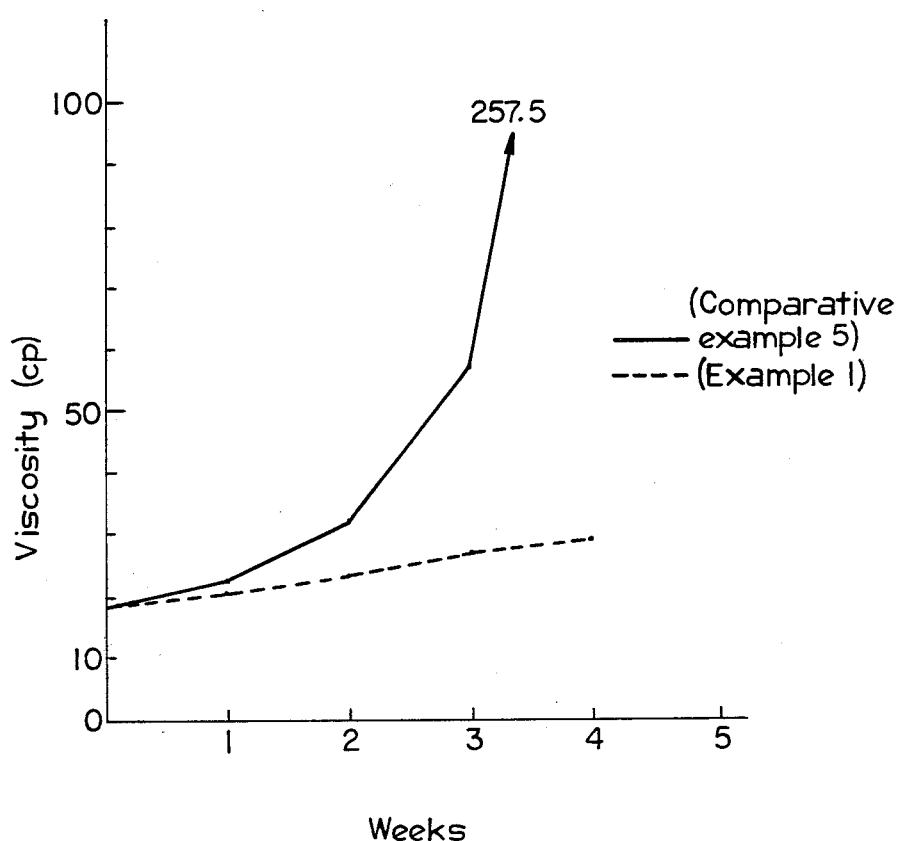

CURABLE ORGANOPOLYSILOXANE COATING COMPOSITION CONTAINING BICYCLIC AMIDINE CURING CATALYST

BACKGROUND OF THE INVENTION

1. Field of the Invention

The present invention relates to a curing composition which is adapted to be coated onto the surfaces of plastic products, etc. and cured to protect the surfaces of the products. More particularly it relates to a coating of a hydrolyzed condensate of an organosilicic compound of which coating is superior in resistance to water and various solvents.

2. Description of Prior Arts

Since shaped plastic products have the defect that they are apt to be easily injured on their surfaces, a proposal has been made to form a cured coating of organopolysiloxane on the surfaces of plastic articles in order to prevent them from being injured on their surfaces. Further, various curing catalysts have generally been employed, at the time when the cured film of polyorganosiloxane is formed, and it has been seen that the properties of the resulting coated film are dependent on the kind of curing catalysts employed. Thus, in order to make the physical properties of the coating suitable for these uses, selection of curing catalysts have been considered to be very important. As for the curing catalysts, aliphatic amines, alkali metal salts of lower fatty acids, etc. have been proposed, and the present inventors, too, have previously proposed various metal salts of carboxylic acids (Japanese Patent Application No. 70103/1976), sodium phosphate (Japanese Patent Application No. 71990/1976), and alkali metal salts of inorganic acids (Japanese Patent Application 76191/1976).

However, in the case of coatings of hydrolyzed condensates of organosilicic compounds obtained by employing the conventional curing catalysts such as alkali metal salts of lower fatty acids, sodium phosphate and alkali metal salts of various inorganic acids, a high hardness and a superior resistance to scratching and abrasion may be obtained, but when they are immersed in water for a long time, cloudiness and small spots occur and also the tight adhesion of the coating onto the base product is reduced. Further, if aliphatic amines, various metal salts of carboxylic acids, etc. are employed as the curing catalyst, blistering and peeling occur in a short period of time in contact with organic solvents although high hardness and a resistance to scratching and abrasion are obtained. Thus, those conventional curing catalysts have been inferior in the point of the resistance to solvents and water. It is added that none has been completely satisfactory under severe conditions although other properties might have been superior.

SUMMARY OF THE INVENTION

The present inventors have accomplished a curing composition which overcomes those defects and capable of forming a coating which is superior in the respect to resistance to water and solvents. Further, the curing composition of the present invention is stabilized, has a very long life i.e. pot life, and is durable to long time use, as compared with those obtained by employing conventional curing catalysts.

In accordance with the present invention, a curing composition comprises:

(a) 100 parts by weight of a curable organosilicic compound containing hydroxyl groups or alkoxy groups bonded to the silicon atom, (b) 0.01-10 parts by weight of one or more of compounds selected from cyclic amidines and weak acid salts of cyclic amidines and (c) a solvent.

By coating a material with this composition, followed by curing with heat, it is possible to obtain a coating which is superior in respect to resistance to water and solvents.

As the curable organosilicic compound containing hydroxyl groups or alkoxy groups bonded to the silicon atom, the hydrolysis and partial condensation product of silicic compounds represented by a general formula $R_nSiX_{4-n}$ (n=0,1,2), wherein R represents the saturated or unsaturated hydrocarbon group, such as an alkyl group having one to four carbon atoms including methyl, ethyl, propyl, or butyl, phenyl, vinyl and allyl, and X represents hydroxyl group, alkoxy group having one to four carbon atoms and chlorine atom and a mixture thereof are preferably used, especially preferably the hydrolysis and partial condensation product of alkyltrialkoxysilanes.

As for preferable alkyltrialkoxysilanes, methyltriethoxysilane is illustrated. As for the hydrolysis and partial condensation product of alkyltrialkoxysilanes, for example, as disclosed in the specification of U.S. Pat. No. 3,451,388, a pre-polymer obtained by adding water and a trace of acid to a starting material and heating the resulting mixture at a temperature of 50-80° C. for 1-10 hours, is illustrated. A co-condensation product together with tetraalkoxysilane or bifunctional siloxane may be also employed in this invention.

In addition, the curable organosilane compound to be used in the present invention may include compounds such that hydroxyl groups have been introduced at the stage of hydrolysis and partial condensation, such as alkyl trichlorosilane.

As for the cyclic amidines and the weak acid salts thereof, bicyclic amidines shown by the general formula

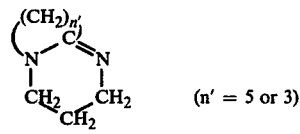

(n' = 5 or 3)

and the phenol salts and the organic carboxylic acid salts of said bicyclic amidines are preferable.

Among such bicyclic amidines, the case of n'=5 corresponds to 1,8-diaza-bicyclo (5.4.0) undecene-7, and the case of n'=3 corresponds to 1,5-diaza-bicyclo (4.3.0) nonene-5.

Bicycloamidines are strongly basic and distinct from general amines in view of the specific chemical properties resulting from the amidine structure of $-N-C=N$.

The phenol to form the phenol salts of the bicyclic amidines includes nucleus-substituted phenols as well. Examples of the organic carboxylic acid salts of the bicyclic amidines include acetate, propionate, butyrate, acrylate, chloro-acetate, octanoate, oleate, stearate, abietate, benzoate, laurate, etc. of the bicyclic amidines.

These salts of the bicyclic amidines not only impart superior physical properties to the coatings compared with lower fatty amines, but also are superior in toxicological properties and good in hygienic properties. The amount of the cyclic amidines and the salts thereof (b) to be added is 0.01–10 parts by weight, preferably 0.5–2 parts by weight based on 100 parts by weight of the organosilicic compounds (a). If the amount is smaller than 0.01 part by weight, there is no effect as the curing catalyst, while if it exceeds 10 parts by weight, the added catalyst acts as a plasticizer and contrarily softens the coating.

The composition of the present invention can be obtained usually by dissolving a hydrolysis and partial condensation product of silane compound in an alcohol of 1–5 carbon atoms, preferably ethyl alcohol, to form a solution, and adding to this solution, a bicyclic amidine or a salt thereof as a curing catalyst and dissolving them together very well. Further, to improve the tight adhesion, it is also possible to add a solvent which has been selected to suit the material of the base. Further, to prevent dewing brought about by a rapid vaporization of the solvent and cloudiness resulting from that, it is also possible to add a solvent suitable therefor, such as a middle boiling solvent, a high boiling solvent, etc. Further, it is also possible to properly add an additive such as a surfactant, an agent for inhibiting gellation of the coating liquid such as an organic carboxylic acid, a dyestuff, a pigment, an ultraviolet absorber, an antistatic agent, or the like. The coating liquid thus prepared is coated onto the material to be coated, followed by drying and curing, to obtain a surface-cured product. The coating of the coating liquid may be carried out according to the immersion method, spraying method or other methods.

The amount of the solvent or solvents is such that it can completely dissolve the components (a) and (b), preferably from 100 parts by weight to 1900 parts by weight based on 100 parts by weight of the components (a) and (b).

The thickness of the film of the resulting coating is usually 1–20μ, preferably about 2–5μ, although it varies depending on the uses of the resulting coated products.

The composition of the present invention is characterized in that it can be cured at a comparatively low temperature, and is also suitable for shaped plastic products having a comparatively low thermal deflection temperature. Usually the curing temperature is about 50° C. to 140° C., preferably 80° C. to 120° C. and the curing time is about 30 minutes to 12 hours, preferably 2 to 5 hours. As for the plastic of the material to be coated, polymethyl methacrylate, polycarbonate, polystyrene, styreneacrylonitrile copolymer resin, ABS resin, styrene-methylmethacrylate-butadiene copolymer, cellulose acetate, cellulose propionate, etc. are illustrated.

The protective coating obtained according to the present invention is superior in the resistance to solvents and water. Further it is also superior in the resistance to scratching and abrasion, the surface hardness, the transparency and the resistance to stress crazing. This is completely durable even under severe conditions, such as at the time of the production and use of sunglasses. Further, the surface-curing composition of the present invention can be cured even at a comparatively low temperature of 50–140° C., and hence has an advantage such that even materials having a low thermal deformation temperature such as plastics can be cured on their surfaces.

In addition, the coating composition of the present invention not only has an object of forming a cured coating on the surface, but also the composition itself can be properly employed for producing a comparatively thick shaped product.

In order that the coating solution of the invention is provided with further improvement of adhesion and resistance to gelation, it may further contain another solvent such as are compatible with the base polymer used therein. When polymethylmethacrylate is used as the base polymer, for the purpose of improvement of adhesion there are used acetic acid, acetates such as ethyl acetate, propyl acetate, butyl acetate, and ethoxyethylacetate, and ketones such as methylethylketone, methylisobutylketone, acetylacetone and diacetonealcohol. The amount of these solvents is 5 to 35 percent by weight on the basis of the total weight of the first inert solvents.

For the purpose of resistance to gelation, there is added an organic carboxylic acid which is so inert that it may not influence the curing of the composition of the invention and it can be removed by vaporization after the coating, such as acetic acid, propionic acid, butyric acid, valeric acid, isovaleric acid, methylethylacetic acid and trimethylacetic acid. The component (a) of the composition according to the invention is stable at pH 3 to 6, while it will proceed with curing under alkaline and strongly acidic conditions.

BRIEF DESCRIPTION OF DRAWING

The drawing shows graphs illustrating the viscosity changes with the passage of time, of coating liquids prepared according to Example 1 and Comparative example 5.

The present invention will be further described below by way of the following Examples.

EXAMPLE 1

120 Parts by weight of methyltriethoxysilane, 30 parts by weight of water and 3 ppm of hydrochloric acid based on the total weight of methyltriethoxysilane and water were introduced into a reactor and heated at 50° C. for 4 hours to obtain a hydrolysis and partial condensation product of methyltriethoxysilane. Heating was further carried out to drive off water and by-produced ethanol, followed by cooling and addition of ethanol, to prepare a 50% solution of the condensate of methyltriethoxysilane (referred to as raw liquid). To this raw liquid were added the following materials to prepare a coating liquid:

| | |
|---|---|
| Raw liquid of hydrolysis partial condensation product of methyltriethoxysilane | 200 parts by weight |
| 1,8-diaza-bicyclo(5.4.0) undecene- (which will be hereinafter abbreviated to DBU) | 2 parts by weight |
| Ethanol | 120 parts by weight |
| Acetic acid | 80 parts by weight |

Acetic acid was added in order to prevent the gellation of the coating liquid, to prolong the pot life, and also to improve the tight adhesion onto a plastic base. A shaped lens of polymethyl methacrylate was degreased by washing, and then coated with the above-mentioned coating liquid by immersing it therein and pulling it up at a rate of 25 cm per one minute, which liquid was just thereafter cured at 90° C. for 5 hours.

The resistance to solvents and water of the resulting surface-cured lens were measured as follows:
Resistance to solvents The concave surface of the lens is placed upwards and acetone is put on this concave surface, and the time period from this instant until blistering or peeling of the cured coat of the methyltrialkoxysilane condensate occur, is measured.

Resistance to solvents is expressed by the time thus measured. The longer the time, the superior is the resistance to solvents.

Resistance to water

It was immersed in hot water at 70° C. for 10 hours. The change in the appearance of the lens after the immersion was observed by the naked eye.

Besides the resistance to solvents and water, measurement of the surface-hardness by means of a hardness meter for pencil; a test of the tight adhesion of the coated film by making crosshatches on the surface of the lens with a razor, applying a regenerated cellulose adhesive tape thereonto and then strongly peeling the tape; a test of the resistance to scratching by rubbing the surface of the lens with steel wool; and measurement of percentage transmittance of light by means of an instrument for measuring the percentage transmittance of light, were carried out. The results are shown in the table shown later.

Further the pot life of the coating liquid according to measurement of viscosity is shown in the drawing.

EXAMPLE 2

Example 1 was repeated except that phenol salt of DBU was substituted for DBU of Example 1.

EXAMPLE 3

Example 1 was repeated except that octanoic acid salt of DBU was substituted for DBU of Example 1.

EXAMPLE 4

Example 1 was repeated except that oleic acid salt of DBU was substituted for DBU of Example 1.

COMPARATIVE EXAMPLE 1

Example 1 was repeated except that diethyl amine was substituted for DBU of Example 1.

COMPARATIVE EXAMPLE 2

Example 1 was repeated except that ethylenediamine was substituted for DBU of Example 1.

COMPARATIVE EXAMPLE 3

Example 1 was repeated except that laurylamine was substituted for DBU of Example 1.

COMPARATIVE EXAMPLE 4

Example 1 was repeated except that nickel acetate was substituted for DBU of Example 1.

COMPARATIVE EXAMPLE 5

Example 1 was repeated except that sodium acetate was substituted for DBU of Example 1.

COMPARATIVE EXAMPLE 6

Example 1 was repeated except that sodium phosphate ($Na_3PO_4 \cdot 12H_2O$) was substituted for DBU of Example 1.

COMPARATIVE EXAMPLE 7

Example 1 was repeated except that sodium borate ($Na_2B_4O_7 \cdot 10H_2O$) was substituted for DBU of Example 1.

The results of Examples 1–4 and Comparative examples 1–7 are summarily shown in the following Table.

| | Curing agent | Resistance to solvent | Resistance to water |
|---|---|---|---|
| Ex. 1 | DBU | 20 min. or longer | Good |
| Ex. 2 | Phenol salt of DBU | " | " |
| Ex. 3 | Octanoic acid salt of DBU | " | " |
| Ex. 4 | Oleic acid salt of DBU | " | " |
| Comparative Ex. | Curing agent | Resistance to solvent | Resistance to water |
| 1 | Diethylamine | 30 seconds or shorter | Good |
| 2 | Ethylenediamine | " | " |
| 3 | Laurylamine | " | " |
| 4 | Nickel acetate | " | " |
| 5 | Sodium acetate | 20 min. or longer | Spots occur; peeling between base and coat |
| 6 | Sodium phosphate | " | Cloud |
| 7 | Sodium borate | " | " |

The resistances to solvents in Examples 1–4 were 20 minutes or longer, whereas those in Comparative Examples 1–4 were 30 seconds or shorter. In comparative Examples 5–7, spots or cloudiness occurred on the surface of the lens or there was peeling of the coating. In addition, as for the surface hardness, tight adherence of the coating, resistance to scratching and percentage transmittance of light, there were no large difference between Examples 1–4 and Comparative Examples 1–7, and any of the lenses had a practical performance.

Further, the viscosity changes of the coating liquid are shown in the drawing. It can be seen that in the case of using DBU according to the present invention (Example 1), the life (pot life) of the coating liquid has been notably improved as compared with the case of using sodium acetate according to Comparative Example (Comparative Example 5). In addition, this applied to other Examples and Comparative examples.

The embodiments of the invention in which an exclusive property or privilege is claimed are defined as follows:

1. A coating solution, consisting essentially of
(a) 100 parts by weight of one or a mixture of hydrolyzed partial condensation products obtained by hydrolyzing and partially condensing one or a mixture of starting compounds having the formula: $R_nSiX_{4-n}$, wherein n is zero, one or two; R is alkyl having one to four carbon atoms, phenyl, vinyl or allyl; and X is hydroxyl, alkoxy having one to four carbon atoms or chlorine,
(b) from 0.01 to 10 parts by weight of one or a mixture of cyclic amidines having the formula:

$$\begin{array}{c} (CH_2)_{n'} \diagdown \\ \diagdown \diagup C = N \\ N \diagup \quad | \\ | \quad CH_2 \\ CH_2 \diagdown \diagup \\ CH_2 \end{array}$$

wherein N' is five or three, and their salts with a weak acid and
(c) one or a mixture of inert organic solvents for components (a) and (b), said inert solvent or solvents being present in an amount sufficient to completely dissolve components (a) and (b).

2. A coating solution as claimed in claim 1, wherein the hydrolysis and partial condensation step is conducted in water at 50° C. to 80° C., for one to 10 to 10 hours in the presence of a trace amount of an acid.

3. A coating solution as claimed in claim 1, wherein "n" is one.

4. A coating solution as claimed in claim 1, wherein the starting compound is methyltriethoxysilane.

5. A coating solution as claimed in claim 1, wherein said solvent is an alcohol having one to five carbon atoms.

6. A coating solution as claimed in claim 1, wherein said weak acid is selected from the group consisting of phenol, substituted phenol, and organic carboxylic acids.

7. A coating solution as claimed in claim 6, wherein said organic carboxylic acid is selected from the group consisting of acetic acid, propionic acid, butyric acid, acrylic acid, chloro-acetic acid, octanoic acid, oleic acid, stearic acid, abietic acid, benzoic acid and lauric acid.

8. A coating solution as claimed in claim 1, wherein the component (b) is present in an amount of 0.5 to 2 parts by weight.

9. A coating solution as claimed in claim 1, wherein the component (b) is selected from the group consisting of 1,8-diaza-bicyclo(5.4.0)undecene-7 and 1,5-diaza-bicyclo(4.3.0)nonene-5.

10. A coating solution as claimed in claim 1, which further contains another solvent selected from carboxylic acids and ketones.

11. A shaped plastic object coated with a coating formed by applying a coating solution as claimed in claim 1 and then curing at 50° to 140° C. for from 30 minutes to 12 hours.

* * * * *

UNITED STATES PATENT AND TRADEMARK OFFICE
CERTIFICATE OF CORRECTION

PATENT NO. : 4 144 221
DATED : March 13, 1979
INVENTOR(S) : Tadayoshi Ikeda et al It is certified that error appears in the above-identified patent and that said Letters Patent are hereby corrected as shown below:

Column 6, line 63; change "N'" to ---n'---.

Column 7, line 3; delete "to 10" (second occurrence).

Signed and Sealed this

Eleventh Day of September 1979

[SEAL]

Attest:

LUTRELLE F. PARKER
Attesting Officer
Acting Commissioner of Patents and Trademarks